(12) United States Patent
Norris

(10) Patent No.: US 8,467,372 B2
(45) Date of Patent: Jun. 18, 2013

(54) WIRELESS COMMUNICATION SYSTEM WITH REORDERING OF DATA SYMBOLS AND RELATED METHODS

(75) Inventor: James A. Norris, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 434 days.

(21) Appl. No.: 12/840,833

(22) Filed: Jul. 21, 2010

(65) Prior Publication Data

US 2012/0020263 A1 Jan. 26, 2012

(51) Int. Cl.
*H04J 3/24* (2006.01)

(52) U.S. Cl.
USPC .......................................... 370/349; 370/476

(58) Field of Classification Search
USPC ................. 370/328, 338, 349, 350, 474, 476, 370/503
See application file for complete search history.

(56) References Cited

U.S. PATENT DOCUMENTS

| | | | | |
|---|---|---|---|---|
| 4,528,661 A * | 7/1985 | Bahr et al. | ..................... | 370/400 |
| 5,325,405 A | 6/1994 | Marko et al. | ................... | 375/114 |
| 5,402,448 A | 3/1995 | Marko et al. | ................... | 375/340 |
| 5,630,081 A * | 5/1997 | Rybicki et al. | ................. | 715/839 |
| 5,850,574 A * | 12/1998 | Takita | .............................. | 710/69 |
| 5,991,311 A | 11/1999 | Long et al. | ..................... | 370/524 |
| 6,128,504 A | 10/2000 | Ciccone | ......................... | 455/464 |
| 6,278,864 B1 * | 8/2001 | Cummins et al. | ............... | 455/73 |
| 6,643,331 B1 * | 11/2003 | Farrell et al. | ................... | 375/261 |
| 7,627,371 B2 * | 12/2009 | Wang et al. | ........................ | 607/2 |
| 7,792,158 B1 * | 9/2010 | Cho et al. | ....................... | 370/518 |
| 8,132,076 B1 * | 3/2012 | Liu | ................................ | 714/762 |
| 8,209,287 B2 * | 6/2012 | Thapa | ........................... | 707/636 |
| 2010/0008272 A1 | 1/2010 | Messinger et al. | ............ | 370/311 |
| 2010/0061362 A1 | 3/2010 | Wang et al. | ................... | 370/350 |
| 2010/0189092 A1 * | 7/2010 | Seki | .............................. | 370/344 |

* cited by examiner

*Primary Examiner* — Ricky Ngo
*Assistant Examiner* — Christine Ng
(74) *Attorney, Agent, or Firm* — Allen, Dyer, Doppelt, Milbrath & Gilchrist, P.A.

(57) ABSTRACT

A wireless communication system may include a wireless transmitter configured to transmit a message including data symbols arranged to include an attention packet and sequencing packets thereafter. The sequencing packets may include common value first portions with each data symbol having a same value, and marker second portions having a marker data symbol. The wireless communication system may include a wireless receiver configured to receive the message from the wireless transmitter based upon the attention packet and the sequencing packets by determining a time delay based upon the positions of the marker data symbol, and reordering data symbols of the message based upon the determined time delay.

36 Claims, 4 Drawing Sheets

WIRELESS COMMUNICATION SYSTEM WITH REORDERING OF DATA SYMBOLS AND RELATED METHODS

FIELD OF THE INVENTION

The present invention relates to the field of wireless communication, and, more particularly, to compensating for time delay in wireless communication systems and related methods.

BACKGROUND OF THE INVENTION

A typical wireless communication system comprises a plurality of wireless communications devices exchanging data with each other. In some wireless communication systems, for example, infrastructure networks, the system may further comprise a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

In certain advantageous wireless communication systems, the transmitted data is packetized. More specifically, the data is formatted into groups of packets for transmission. Each group of packets is transmitted via a forward transmission, which comprises of a preamble portion and a body portion associated therewith, i.e. a forward transmission block. The body portion is commonly known as the payload and typically comprises user generated data, i.e. groups of packets. The preamble portion may include control information. The control information may include information the wireless communication system uses to deliver the user data, for example, source and destination addresses, error detection codes such as checksums, sequencing information, and synchronization information.

As will be appreciated by those skilled in the art, the preamble portion may include a synchronization sequence for synchronizing the receipt of the forward transmission block. For example, the synchronization information may include a pseudo random number sequence and framing bits. For example, U.S. Pat. No. 5,402,448 to Marko et al. discloses a communication system for cordless handsets that uses burst transmission methods. More specifically, the transmitter transmits continuously for five frames, repeating the data four times, while the receiver receives for two frames. Each frame has multiple frame synchronization words for synchronization purposes.

Yet in certain low power applications that use periodic windows for receiving communications, these aforementioned synchronization approaches may not be practical since the window length is limited. Proper synchronization is particularly helpful in communications applications where the transmissions have significant time delay. For example, in the typical satellite relay, the time needed for the transmission to travel the significant distance may introduce time delay, thereby potentially rendering the data received in a periodic window as unintelligible.

SUMMARY OF THE INVENTION

In view of the foregoing background, it is therefore an object of the present invention to provide a wireless communication system that efficiently synchronizes received messages.

This and other objects, features, and advantages in accordance with the present invention are provided by a wireless communication system. The wireless communication system may include a wireless transmitter configured to transmit a message comprising a plurality of data symbols arranged to include at least one attention packet and a plurality of sequencing packets thereafter. The plurality of sequencing packets may comprise common value first portions with each data symbol having a same value, and marker second portions comprising a marker data symbol. The wireless communication system may also include a wireless receiver configured to receive the message from the wireless transmitter based upon the at least one attention packet and the plurality of sequencing packets by determining a time delay based upon the positions of the marker data symbol, and reordering data symbols of the message based upon the determined time delay. Advantageously, the wireless receiver can correctly order the received message without inefficient framing bits of the typical wireless communication system.

In some embodiments, the marker data symbol in each marker second portion may have an incremented position in each successive sequencing packet. More specifically, each attention packet and each sequencing packet may have a set packet time duration based upon a number of data symbols therein. The wireless receiver may be configured to operate using a periodic receive time window having a time period equal to the set packet time duration. In some embodiments, the wireless receiver may be configured to operate in a low power sleep mode between adjacent ones of the periodic receive time windows.

Additionally, the wireless transmitter may be configured to transmit the message comprising the plurality of data symbols further arranged to include at least one start of message (SOM) packet after the plurality of sequencing packets. Further, the wireless transmitter may be configured to transmit the message comprising the plurality of data symbols further arranged to include a payload portion following the at least one SOM packet.

In other embodiments, the wireless transmitter may be configured to transmit the at least one attention packet as a plurality of redundant attention packets. Furthermore, the wireless transmitter may be configured to transmit the plurality of redundant attention packets with each comprising data symbols having a common value.

For example, each data symbol may comprise one of a binary data symbol, a 4-ary data symbol, an 8-ary data symbol, and a 16-ary data symbol. Also, the wireless transmitter may comprise a satellite wireless transmitter.

Another aspect is directed to a method of wireless communication. The method may include wirelessly transmitting a message comprising a plurality of data symbols arranged to include at least one attention packet and a plurality of sequencing packets thereafter. The plurality of sequencing packets may comprise common value first portions with, each data symbol having a same value, and marker second portions comprising a marker data symbol with incremented positions in each successive sequencing packet. The method may also include wirelessly receiving the message based upon the at least one attention packet and the plurality of sequencing packets by determining a time delay based upon the incremented positions of the marker data symbol, and reordering data symbols of the message based upon the determined time delay.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
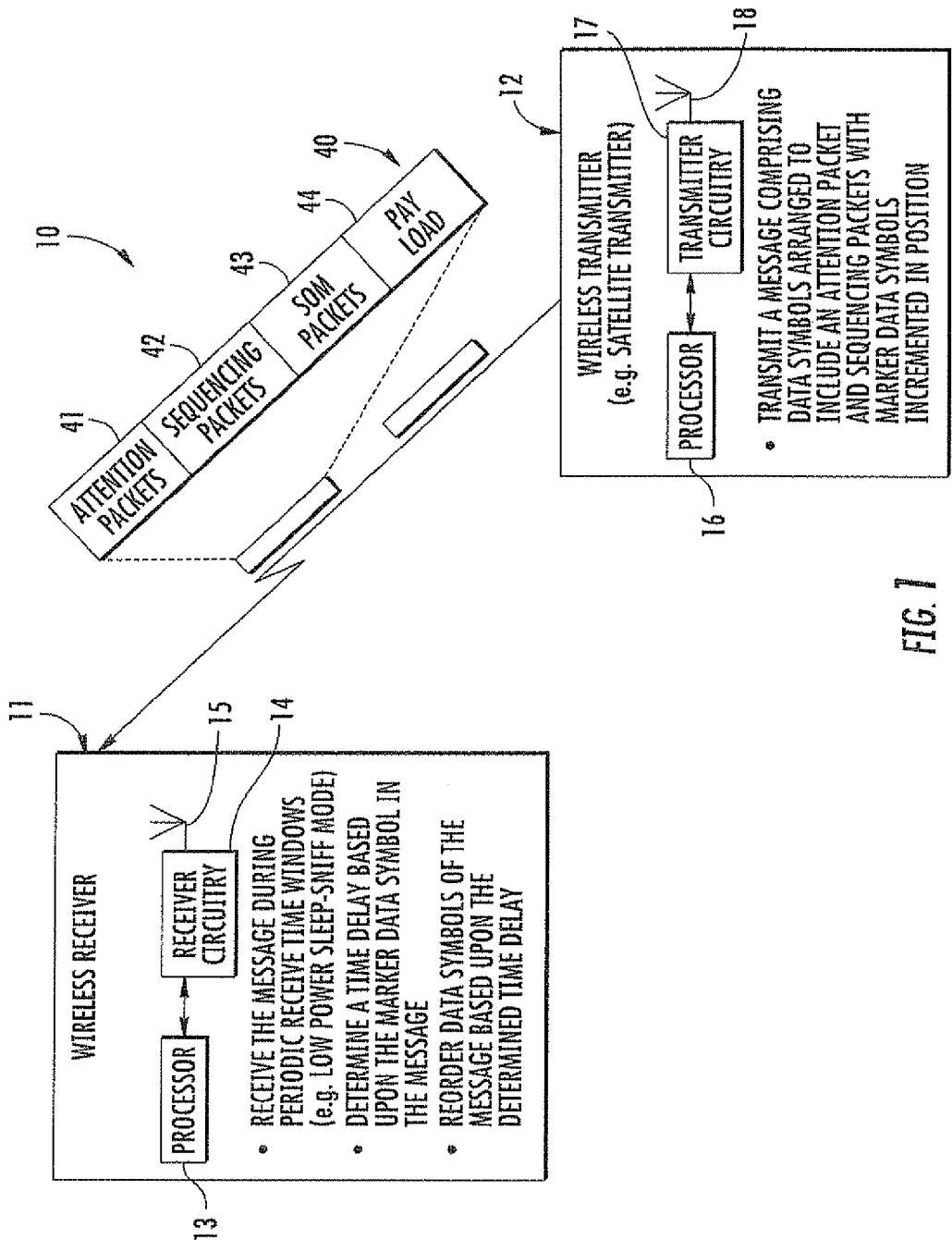
FIG. 1 is a schematic block diagram of a wireless communication system, according to the present invention.
Figure 2:
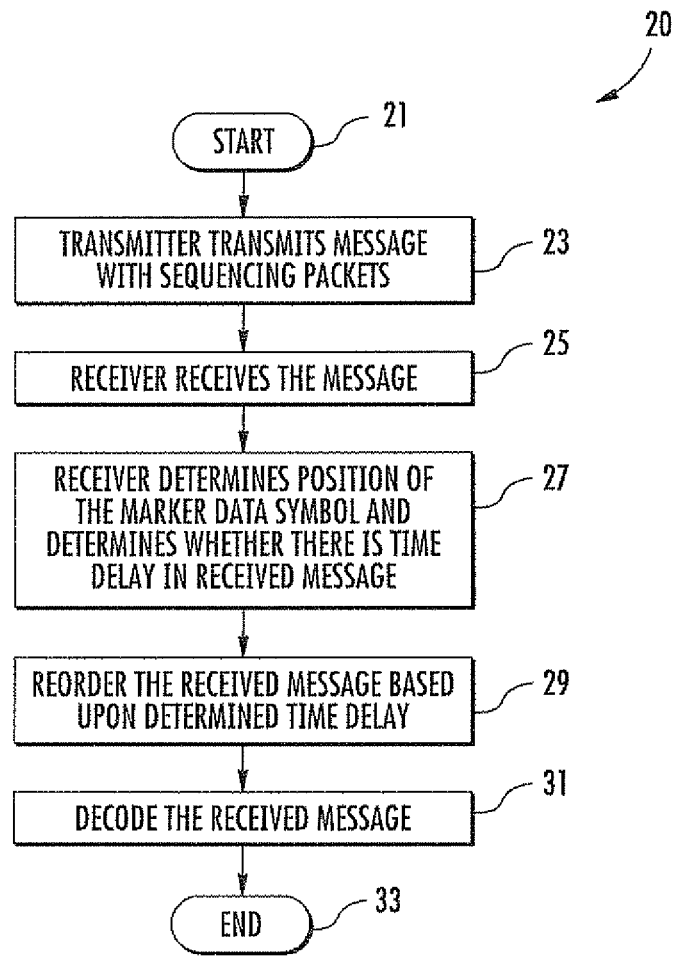
FIG. 2 is a flowchart illustrating operation of the wireless communication system of FIG. 1.

Referring initially to FIGS. 1-2, a wireless communication system 10 according to the present invention is now described. The wireless communications system 10 illustratively includes a wireless receiver 11, and a wireless transmitter 12 communicating therewith. Furthermore, a flowchart 20 illustrates a method of operating the wireless communication system 10, which begins at Block 21. The wireless receiver 11 illustratively includes an antenna 15, a receiver circuitry 14 coupled to the antenna, and a processor 13 coupled to the receiver circuitry. The wireless transmitter 12 illustratively includes an antenna 18, a transmitter circuitry 17 coupled to the antenna, and a processor 16 coupled to the transmitter circuitry.

As will be appreciated by those skilled in the art, the wireless communications devices 11, 12 may include a plurality of differing types of wireless communications devices modified according to the teachings herein, for example, the Falcon® III/117G ANW2, or SBR/SPR, as available from the Harris Corporation of Melbourne, Fla., the assignee of the present application. In yet other embodiments, the wireless communications devices 11, 12 may comprise satellite wireless communications devices.

The wireless communication system 10 may use a communication protocol including a form of error correction. For example, the communication protocol may include a Gaussian Frequency-Shift Keying (GFSK) modulation waveform with forward error correction (FEC). In particular, the error correction may, for example, be Reed Solomon (RS) code, low-density parity-check (LDPC) code, and cyclic redundancy check (CRC) code.

As illustrated, the wireless transmitter 12 is configured to transmit a message 40 that illustratively comprises a plurality of data symbols (Block 23). Each data symbol illustratively includes the illustrated binary data symbol, i.e. a bit, or may alternatively comprise a 4-ary data symbol, an 8-ary data symbol, or a 16-ary data symbol, for example.

Figure 3A:
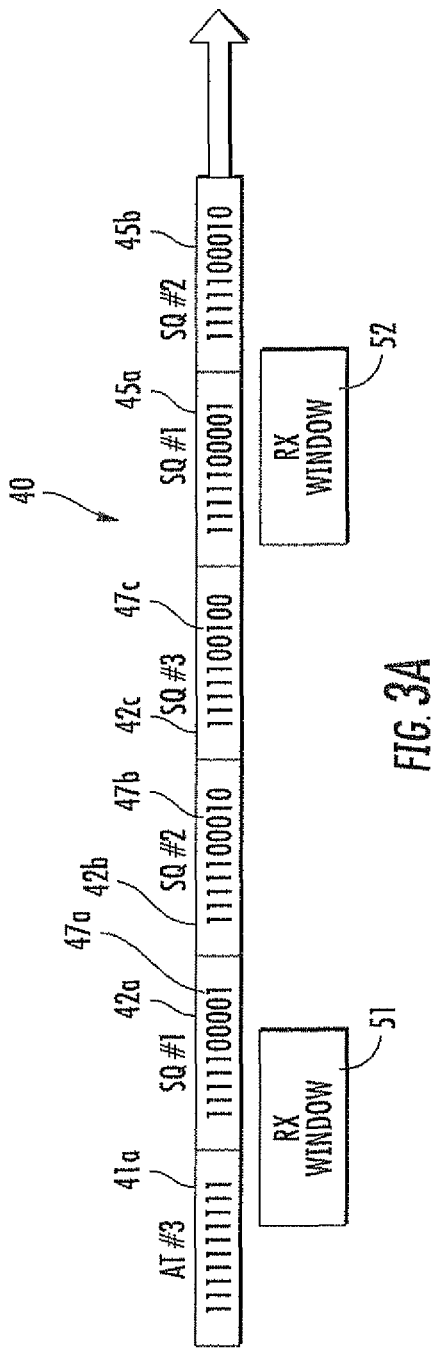
FIGS. 3A-3B are schematic diagrams of messages transmitted in the wireless communication system of FIG. 1.
Figure 3B:
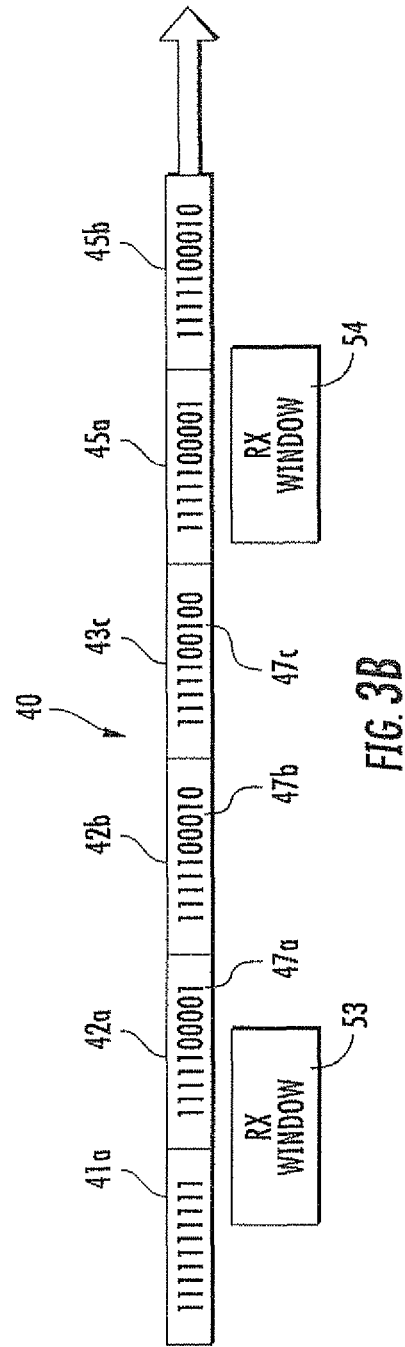

Referring additionally to FIGS. 3A-3B, the message 40 is illustratively arranged to include a plurality of attention packets 41a-41c (FIG. 4) and a plurality of sequence packets 42a-42c thereafter (FIG. 4). Furthermore, the wireless transmitter 12 is illustratively configured to transmit the plurality of attention packets with each comprising data symbols having a common value. In the illustrated embodiment, each of the bits in the plurality of attention packets 41a-41c is set at a 1-value. Nevertheless, it may be readily appreciated that the plurality of attention packets 41a-41c may have their data symbol value inverted to be all 0-values. As will be appreciated by those skilled in the art, the plurality of attention packets 41a-41c assist the wireless receiver 11 to separate the "signal" preamble processing (determining of the carrier phase, frequency, and symbol timing of the received signal) in the wireless receiver from the re-ordering processing described herein.

Each of the plurality of sequencing packets 42a-42c illustratively includes common value first portions with each data symbol having a same value. In the illustrated embodiment, each of the common value portions are set to a 1-value. Nevertheless, these common value first portions could also be set to a 0-value. Each of the plurality of sequencing packets 42a-42c further illustratively includes marker second portions comprising a marker data symbol 47a-47c with incremented positions in each successive sequencing packet. In the illustrated embodiment, the marker bit 47a-47c is a 1-value, but it can be easily appreciated that it this arrangement could be inverted, i.e. a 0-value being incremented in surrounding 1-values. Also, in yet other embodiments, the marker bit 47a-47c may not have an incremented position, i.e. it may have a static position in each sequencing packet 42a-42c.

Additionally, the wireless transmitter 12 is illustratively configured to transmit the message 40 comprising the plurality of data symbols further arranged to include a plurality of start of message (SOM) packets 43 after the plurality of sequencing packets 42a-42c, and a payload portion 40 following the plurality of SOM packets.

As will be appreciated by those skilled in the art, the wireless receiver 11 is illustratively configured to operate with periodic receive time windows 51-54. In some embodiments, the wireless receiver 11 may be configured to operate in a low power sleep mode between adjacent ones of the periodic receive time windows 51-54. For example, the wireless receiver 11 may implement a sleep-sniff protocol.

The wireless receiver 11 is illustratively configured to receive the message 40 from the wireless transmitter 12 based upon the plurality of attention packets 41a-41c and the plurality of sequencing packets 42a-42c by determining a time delay based upon the incremented positions of the marker data symbol 47a-47c (Blocks 25 & 27). The wireless receiver 11 also reorders data symbols of the message 40 based upon the determined time delay (Block 29). Of course, in embodiments of the wireless communications system 10 where the marker bit 47a-47c does not have an incremented position, the wireless receiver 11 may still reorder the data symbols of the message 40, but it cannot determine exact absolute time delay as in the incremented embodiments. These embodiments determine relative time delay of the particular received sequential packet 42a-42c being reordered.

As will be appreciated by those skilled in the art, there is strict time discipline between the periodic receive time windows 51-54 and the packet length transmitted in the wireless communication system 10. More specifically, each attention packet 41a-41c and each sequencing packet 42a-42c may have a set packet time duration based upon a number of data symbols therein, illustratively shown as ten bits. The wireless receiver 11 may be configured to operate using a periodic receive time window 51-54 having, a time period equal to the set packet time duration.

In the illustrated embodiment, the wireless transmitter 12 is configured to transmit the plurality of attention packets in a redundant manner, i.e. the attention packet 41a-41c is repeated three times. Furthermore, the wireless transmitter 12 is configured to redundantly transmit the sequencing packets 42a-42c. In combination with this triple redundancy, the wireless receiver 11 operates with an illustrative duty cycle of 33%, which assures complete receipt of the message 40.

Advantageously, and as perhaps best seen in FIGS. 3A-3B, the wireless receiver 11 can correctly order the received message 40 without inefficient framing bits. In FIG. 3A, the wireless receiver 11 has a periodic receive time window 51 that overlaps the "1111000011" string of bits. The string of bits is unique, i.e. nowhere else does series of four zero values appear, and it tells the wireless receiver 11 that it is time aligned with the first sequencing packet 42a (SQ1) and that the last received bit needs to be reordered to appear in the first position. In the illustrated embodiment, the message 40 illustratively includes a second set of sequencing packets 45a-45b, which may be used for FEC. For example, the wireless receiver 11 could use a majority vote on three sets of periodic receive time windows to eliminate a bit error.

In FIG. 3B, the first periodic receive time window 53 is too early to be used as a sequencing packet, i.e. there are not enough zero values to form a unique string of bits. Nevertheless, the second periodic receive time window 54, which overlaps the "1001111100" string of bits, indicates that the third sequencing packet 42c has been demodulated and that the last seven bits need to be reordered to precede the first three (Blocks 31 & 33).

Figure 4A:
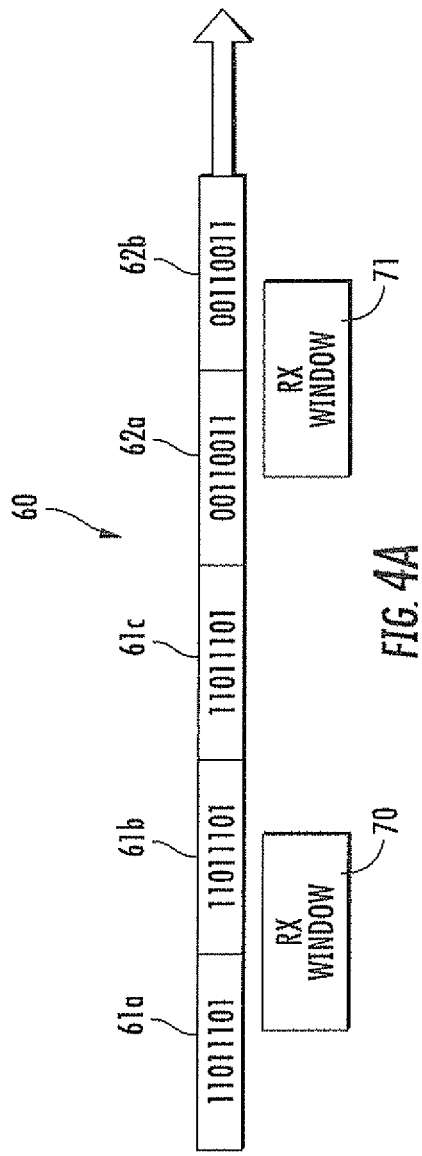
FIGS. 4A-4B are schematic diagrams of messages transmitted in the typical wireless communication system.
Figure 4B:
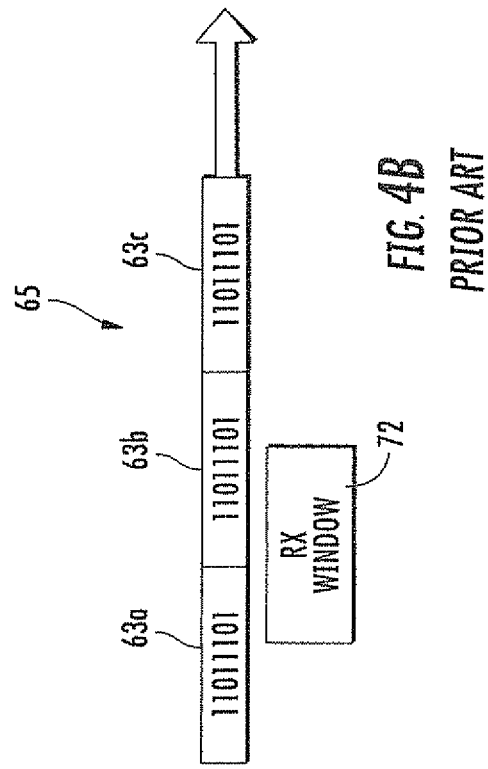

Referring briefly to FIGS. 4A-4B, the aforementioned wireless communication system 10 avoids the drawbacks of the received message 65 in a typical communication system. The typical wireless receiver receives the first message 60 successfully since it is aligned in time, i.e. there is zero time delay and the periodic receive time windows 70-71 align with their corresponding packets 61a & 62a, and may demodulate the message 60 (packets 61a-61c, 62a-2b) and all data symbols therein in order. Problematically, the typical wireless receiver fails to receive the second message 65 because the periodic receive time window 72 has unexpected delay in relation to the packets 63a-63c.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communication system comprising:
a wireless transmitter configured to transmit a message comprising a plurality of data symbols arranged to include at least one attention packet and a plurality of sequencing packets thereafter, the plurality of sequencing packets comprising common value first portions with each data symbol having a same value, and marker second portions comprising a marker data symbol; and
a wireless receiver configured to receive the message from said wireless transmitter based upon the at least one attention packet and the plurality of sequencing packets by
determining a time delay based upon the positions of the marker data symbol, and
reordering data symbols of the message based upon the determined time delay.

2. The wireless communication system according to claim 1 wherein the marker data symbol in each marker second portion has an incremented position in each successive sequencing packet; and wherein said wireless receiver is configured to determine the time delay based upon the incremented positions of the marker data symbol.

3. The wireless communication system according to claim 1 wherein each attention packet and each sequencing packet has a set packet time duration based upon a number of data symbols therein; and wherein said wireless receiver is configured to operate using a periodic receive time window having a time period equal to the set packet time duration.

4. The wireless communication system according to claim 3 wherein said wireless receiver is configured to operate in a low power sleep mode between adjacent ones of the periodic receive time windows.

5. The wireless communication system according to claim 1 wherein said wireless transmitter is configured to transmit the message comprising the plurality of data symbols further arranged to include at least one start of message (SOM) packet after the plurality of sequencing packets.

6. The wireless communication system according to claim 5 wherein said wireless transmitter is configured to transmit the message comprising the plurality of data symbols further arranged to include a payload portion following the at least one SOM packet.

7. The wireless communication system according to claim 1 wherein said wireless transmitter is configured to transmit the at least one attention packet as a plurality of redundant attention packets.

8. The wireless communication system according to claim 7 wherein said wireless transmitter is configured to transmit the plurality of redundant attention packets with each comprising data symbols having a common value.

9. The wireless communication system according to claim 1 wherein each data symbol comprises one of a binary data symbol, a 4-ary data symbol, an 8-ary data symbol, and a 16-ary data symbol.

10. The wireless communication system according to claim 1 wherein said wireless transmitter comprises a satellite wireless transmitter.

11. A wireless communication system comprising:
a wireless transmitter configured to transmit a message comprising a plurality of data symbols arranged to include a plurality of redundant attention packets and a plurality of sequencing packets thereafter, the plurality of sequencing packets comprising common value first portions with each data symbol having a same value, and marker second portions comprising a marker data symbol with incremented positions in each successive sequencing packet;
each attention packet and each sequencing packet having a set packet time duration based upon a number of data symbols therein; and
a wireless receiver configured to operate using a periodic receive time window having a time period equal to the set packet time duration and to receive the message from said wireless transmitter based upon the plurality of redundant attention packets and the plurality of sequencing packets by
determining a time delay based upon the incremented positions of the marker data symbol, and
reordering data symbols of the message based upon the determined time delay.

12. The wireless communication system according to claim 11 wherein said wireless receiver is configured to operate in a low power sleep mode between adjacent ones of the periodic receive time windows.

13. The wireless communication system according to claim 11 wherein said wireless transmitter is configured to transmit the message comprising the plurality of data symbols further arranged to include at least one start of message (SOM) packet after the plurality of sequencing packets.

14. The wireless communication system according to claim 13 wherein said wireless transmitter is configured to transmit the message comprising the plurality of data symbols further arranged to include a payload portion following the at least one SOM packet.

15. The wireless communication system according to claim 11 wherein said wireless transmitter is configured to transmit the plurality of redundant attention packets with each comprising data symbols having a common value.

16. A wireless transmitter comprising:
a transmitter circuitry; and
a processor cooperating therewith and configured to transmit a message to a wireless receiver and comprising a plurality of data symbols arranged to include at least one attention packet and a plurality of sequencing packets thereafter, the plurality of sequencing packets comprising common value first portions with each data symbol having a same value, and marker second portions comprising a marker data symbol, the wireless receiver being configured to receive the message based upon the at least one attention packet and the plurality of sequencing packets by determining a time delay based upon the positions of the marker data symbol, and reordering data symbols of the message based upon the determined time delay.

17. The wireless transmitter according to claim 16 wherein said processor is configured to transmit the message with the marker data symbol in each marker second portion having an incremented position in each successive sequencing packet.

18. The wireless transmitter according to claim 16 wherein each attention packet and each sequencing packet has a set packet time duration based upon a number of data symbols therein; and wherein the wireless receiver is configured to operate using a periodic receive time window having a time period equal to the set packet time duration.

19. The wireless transmitter according to claim 18 wherein the wireless receiver is configured to operate in a low power sleep mode between adjacent ones of the periodic receive time windows.

20. The wireless transmitter according to claim 16 wherein said processor is configured to transmit the message comprising the plurality of data symbols further arranged to include at least one start of message (SOM) packet after the plurality of sequencing packets.

21. The wireless transmitter according to claim 20 wherein said processor is configured to transmit the message comprising the plurality of data symbols further arranged to include a payload portion following the at least one SOM packet.

22. The wireless transmitter according to claim 16 wherein said processor is configured to transmit the at least one attention packet as a plurality of redundant attention packets.

23. The wireless transmitter according to claim 22 wherein said processor is configured to transmit the plurality of redundant attention packets with each comprising data symbols having a common value.

24. A wireless receiver communicating with a wireless transmitter transmitting a message comprising a plurality of data symbols arranged to include at least one attention packet and a plurality of sequencing packets thereafter, the plurality of sequencing packets comprising common value first portions with each data symbol having a same value, and marker second portions comprising a marker data symbol, the wireless receiver comprising:
a receiver circuitry; and
a processor cooperating therewith and configured to receive the message from the wireless transmitter based upon the at least one attention packet and the plurality of sequencing packets by
determining a time delay based upon the positions of the marker data symbol, and
reordering data symbols of the message based upon the determined time delay.

25. The wireless receiver according to claim 24 wherein the marker data symbol in each marker second portion has an incremented position in each successive sequencing packet; and wherein said processor is configured to determine the time delay based upon the incremented positions of the marker data symbol.

26. The wireless receiver according to claim 24 wherein each attention packet and each sequencing packet has a set packet time duration based upon a number of data symbols therein; and wherein said processor is configured to operate using a periodic receive time window having a time period equal to the set packet time duration.

27. The wireless receiver according to claim 26 wherein said processor is configured to operate in a low power sleep mode between adjacent ones of the periodic receive time windows.

28. A method of wireless communication comprising:
wirelessly transmitting a message comprising a plurality of data symbols arranged to include at least one attention packet and a plurality of sequencing packets thereafter, the plurality of sequencing packets comprising common value first portions with each data symbol having a same value, and marker second portions comprising a marker data symbol; and
wirelessly receiving the message based upon the at least one attention packet and the plurality of sequencing packets by
determining a time delay based upon the positions of the marker data symbol, and
reordering data symbols of the message based upon the determined time delay.

29. The method according to claim 28 wherein the marker data symbol in each marker second portion has an incremented position in each successive sequencing packet; and wherein wirelessly receiving the message comprises determining the time delay based upon the incremented positions of the marker data symbol.

30. The method according to claim 28 further comprising:
transmitting each attention packet and each sequencing packet having a set packet time duration based upon a number of data symbols therein; and
using a periodic receive time window having a time period equal to the set packet time duration.

31. The method according to claim 30 further comprising operating in a low power sleep mode between adjacent ones of the periodic receive time windows.

32. The method according to claim 28 further comprising transmitting the message comprising the plurality of data symbols further arranged to include at least one start of message (SOM) packet after the plurality of sequencing packets.

33. The method according to claim 32 further comprising transmitting the message comprising the plurality of data symbols further arranged to include a payload portion following the at least one SOM packet.

34. The method according to claim 28 further comprising transmitting the at least one attention packet as a plurality of redundant attention packets.

35. The method according to claim 34 further comprising transmitting the plurality of redundant attention packets with each comprising data symbols having a common value.

36. The method according to claim 28 wherein each data symbol comprises one of a binary data symbol, a 4-ary data symbol, an 8-ary data symbol, and a 16-ary data symbol.

\* \* \* \* \*